United States Patent
Nam et al.

(10) Patent No.: US 11,225,189 B2
(45) Date of Patent: Jan. 18, 2022

(54) U-TURN INDICATOR REAR LAMP AND AUTONOMOUS DRIVING METHOD USING SAME

(71) Applicants: Juyeon Nam, Seoul (KR); Yeonjun Kim, Seoul (KR); Yeonjae Kim, Seoul (KR)

(72) Inventors: Juyeon Nam, Seoul (KR); Yeonjun Kim, Seoul (KR); Yeonjae Kim, Seoul (KR)

( * ) Notice: Subject to any disclaimer, the term of this patent is extended or adjusted under 35 U.S.C. 154(b) by 12 days.

(21) Appl. No.: 16/759,288

(22) PCT Filed: May 16, 2018

(86) PCT No.: PCT/KR2018/005636
§ 371 (c)(1),
(2) Date: Apr. 24, 2020

(87) PCT Pub. No.: WO2019/083108
PCT Pub. Date: May 2, 2019

(65) Prior Publication Data
US 2020/0298748 A1    Sep. 24, 2020

(30) Foreign Application Priority Data
Oct. 26, 2017  (KR) .......................... 10-2017-0139916

(51) Int. Cl.
*B60Q 1/34*   (2006.01)
*B60Q 1/26*   (2006.01)
*B60Q 1/50*   (2006.01)

(52) U.S. Cl.
CPC .......... *B60Q 1/346* (2013.01); *B60Q 1/2607* (2013.01); *B60Q 1/2696* (2013.01); *B60Q 1/50* (2013.01); *B60Q 2300/142* (2013.01)

(58) Field of Classification Search
CPC ... B60Q 9/00; B60Q 1/50; B60Q 1/52; B60Q 1/525; B60Q 5/006; B60Q 1/26;
(Continued)

(56) References Cited

U.S. PATENT DOCUMENTS

2005/0237174 A1    10/2005  Hu
2020/0130567 A1*   4/2020   Taniguchi ................ B60Q 1/38

FOREIGN PATENT DOCUMENTS

| JP | 07-257274 A   | 10/1995 |
| KR | 20-0178756 Y1 | 4/2000  |

(Continued)

*Primary Examiner* — Wei (Victor) Y Chan
(74) *Attorney, Agent, or Firm* — Maschoff Brennan (57) ABSTRACT

A rear lamp includes a reverse light, a direction indicator light, a brake light and a taillight, which are provided inside a lamp case. The rear lamp includes left and right rear lamps and has a peripheral area and a center area. The peripheral area is disposed on the outer side of the center area. The reverse light, the brake right and the taillight are positioned in the center area. The direction indicator light is positioned in the peripheral area and is formed as an LED array in the shape of a "C" or "inverted-U". The left rear lamp has a U-turn indicator light and a left turn indicator light. The right rear lamp has a right turn indicator light. When the U-turn indicator light activates, the entire LED array turns on. When the left turn indicator light activates, only a part of the LED array turns on.

1 Claim, 4 Drawing Sheets

(58) Field of Classification Search
CPC ...... B60Q 5/005; B60Q 9/008; B60Q 1/0035;
B60Q 1/143; B60Q 1/503
See application file for complete search history.

(56) References Cited

FOREIGN PATENT DOCUMENTS

| | | | |
|---|---|---|---|
| KR | 20-0236557 | Y1 | 10/2001 |
| KR | 20-0277810 | Y1 | 6/2002 |
| KR | 10-2003-0087678 | A | 11/2003 |
| KR | 10-2010-0115859 | A | 10/2010 |
| KR | 10-1067990 | B1 | 9/2011 |
| KR | 10-1078142 | B1 | 10/2011 |

* cited by examiner

U-TURN INDICATOR REAR LAMP AND AUTONOMOUS DRIVING METHOD USING SAME

TECHNICAL FIELD

The present invention relates to a U-turn indicator rear lamp and an autonomous driving method using the same, and more particularly, to a U-turn indicator rear lamp in which a U-turn indicator light is provided in the rear lamp to indicate an intention for a U-turn, so that a following vehicle attempting to turn left may easily select a lane when the U-turn indicator light in a front vehicle waiting on a first lane that allows to make a U-turn and a left turn is turned on, and an autonomous driving method using the U-turn indicator rear lamp in which the U-turn indicator light is applied to V2V and V2X connectivity technologies.

BACKGROUND ART

Most vehicles currently on the market are provided with direction indicator light for indicating an intention to perform a left or right turn to other vehicle drivers while traveling.

However, when a vehicle enters a first lane that allows to make a U-turn and a left turn at an intersection while traveling, it is difficult to accurately determine whether a front vehicle will make a left turn or a U-turn by using only a signal indicated by a conventional direction indicator light.

In general, the vehicle is driven at a slower speed during the U-turn than the left turn. Therefore, when a vehicle that previously enters the first lane at the intersection indicates to following vehicles that the vehicle will make a left turn or a U-turn by using a rear lamp, the following vehicles may be prevented from causing a collision accident with the front vehicle by reducing a speed when entering the first lane or by entering a second lane and turning left, and the following vehicles may rapidly pass through the intersection so that traffic jams may be improved, a waiting time at the intersection may be reduced, and fuel efficiency may be improved.

Meanwhile, as a technology for indicating an intention for a U-turn to a following vehicle, Korean Patent Registration No. 10-1067990 discloses a vehicle taillight using an LED, the vehicle taillight including: a first edge LED; and a U-turn indicator LED flashing part including a U-turn indicator LED disposed on an inner side of the first edge LED.

In addition, Korean Patent Registration No. 10-1078142 discloses an apparatus for displaying U-turn and instant parking states for a vehicle, including a U-turn indicator LED flashing device provided at a rear of the vehicle and configured to flash according to an operation of a wireless operation switch unit mounted in an interior of the vehicle.

In addition, Korean Utility Model Registration No. 20-0178756 discloses a U-turn indicator lamp for a vehicle, the U-turn indicator lamp including: a U-turn indicator light provided at a rear of the vehicle; a flash driving unit connected to the U-turn indicator light to flash the U-turn indicator light; and an operation switch provided around a driver seat of the vehicle to operate the flash driving unit.

In addition, Korean Utility Model Registration No. 20-0236557 discloses a U-turn indicator device for a vehicle, in which a green U-turn indicator light is partially configured in a direction indicator light of the vehicle, and the direction indicator light is electrically connected to a switch provided on an operation lever of a steering system so as to be turned on.

The above related art documents disclose a structure in which a separate indicator light for indicating an intention for a U-turn is additionally provided at a rear portion of a vehicle.

DETAILED DESCRIPTION OF THE INVENTION

Technical Problem

An object of the present invention is to provide a U-turn indicator rear lamp and an autonomous driving method using same, in which the U-turn indicator rear lamp is provided at a rear portion of a vehicle to indicate an intention for a U-turn to a rear vehicle, and an indicator light for indicating the intention for a U-turn is used in combination with an existing indicator light which is basically mounted in the vehicle, so that a production cost may be reduced.

In addition, an object of the present invention is to provide a U-turn indicator rear lamp and an autonomous driving method using same, capable of minimizing an influence on design and identity implementation of a vehicle, which is avoided by most complete vehicles, in order to emphasize differentiation.

The objects to be accomplished by the present invention are not limited to the above objects. Other objects that are not described above may be clearly understood by a person having ordinary skill in the art to which the invention pertains from the following description.

Technical Solution

According to the present invention, a rear lamp includes a reverse light, a direction indicator light, a brake light, and a taillight, which are provided inside a lamp case, wherein the rear lamp includes a left rear lamp and a right rear lamp, the rear lamp includes a peripheral area and a center area, the peripheral area is disposed on an outer side of the center area to surround the center area, the reverse light, the brake right, and the taillight are provided in the center area, the direction indicator light is provided in the peripheral area and configured by an LED array arranged in a C-shape or an inverted-U-shape with a predetermined width, in a case of a right-hand vehicle traffic lane, the direction indicator light of the left rear lamp includes a U-turn indicator light and a left turn indicator light, and the direction indicator light of the right rear lamp includes a right turn indicator light, in a case of a left-hand vehicle traffic lane, the direction indicator light of the right rear lamp includes a U-turn indicator light and a right turn indicator light, and the direction indicator light of the left rear lamp includes a left turn indicator light, when the direction indicator light of the rear lamp is the U-turn indicator light, the LED array provided in the direction indicator light is turned on simultaneously or sequentially, and when the direction indicator light of the rear lamp is the left or right turn indicator light, a part of the LED array provided in the direction indicator light is turned on.

According to the present invention, a rear lamp includes a reverse light, a direction indicator light, a brake light, and a taillight, which are provided inside a lamp case, wherein the rear lamp includes a left rear lamp and a right rear lamp, the left and right rear lamps include a peripheral area and a center area, the peripheral area is disposed on an outer side of the center area to surround the center area, the reverse light, the brake right, and the taillight are provided in the center area, the direction indicator light is provided in the peripheral area and configured by an LED array arranged in a C-shape or an inverted-U-shape with a predetermined width, and includes left, upper, and right LED arrays which are consecutively provided, in a case of a right-hand vehicle traffic lane, the direction indicator light of the left rear lamp includes a U-turn indicator light and a left turn indicator light, and the direction indicator light of the right rear lamp includes a right turn indicator light, in a case of a left-hand vehicle traffic lane, the direction indicator light of the right rear lamp includes a U-turn indicator light and a right turn indicator light, and the direction indicator light of the left rear lamp includes a left turn indicator light, when the direction indicator light of the rear lamp is the U-turn indicator light, the left, upper, and right LED arrays provided in the direction indicator light are turned on simultaneously or sequentially, and when the direction indicator light of the rear lamp is the left or right turn indicator light, a part of the left, upper, and right LED arrays provided in the direction indicator light is turned on.

According to the present invention, a rear lamp includes a reverse light, a direction indicator light, a brake light, and a taillight, which are provided inside a lamp case, wherein the rear lamp includes a left rear lamp and a right rear lamp, the left and right rear lamps include a peripheral area, a center area, and an outer area, the center area is disposed on an inner side of the peripheral area, the outer area is disposed on an outer side of the peripheral area, the direction indicator light is provided in the peripheral area and configured by an LED array arranged in a C-shape or an inverted-U-shape with a predetermined width, and includes left, upper, and right LED arrays which are consecutively provided, at least one or two indicator light sources among the reverse light, the brake right, and the taillight are provided in the center area, an indicator light source except for the indicator light sources provided in the center area and the peripheral area is provided in the outer area, in a case of a right-hand vehicle traffic lane, the direction indicator light of the left rear lamp includes a U-turn indicator light and a left turn indicator light, and the direction indicator light of the right rear lamp includes a right turn indicator light, in a case of a left-hand vehicle traffic lane, the direction indicator light of the right rear lamp includes a U-turn indicator light and a right turn indicator light, and the direction indicator light of the left rear lamp includes a left turn indicator light, when the direction indicator light of the rear lamp is the U-turn indicator light, the left, upper, and right LED arrays provided in the direction indicator light are turned on simultaneously or sequentially, and when the direction indicator light of the rear lamp is the left or right turn indicator light, a part of the left, upper, and right LED arrays provided in the direction indicator light is turned on.

According to the present invention, a rear lamp including a reverse light, a direction indicator light, a brake light, and a taillight, which are provided inside a lamp case, wherein the rear lamp includes a left rear lamp and a right rear lamp, the left and right rear lamps include an outermost area and a remaining area, the outermost area refers to a left area in a case of the left rear lamp or a right area in a case of the right rear lamp, the direction indicator light is provided in the outermost area and configured by an LED array arranged in a C-shape or an inverted-U-shape with a predetermined width, and includes left, upper, and right LED arrays which are consecutively provided, at least one or two indicator light sources among the reverse light, the brake right, and the taillight are provided in the remaining area, in a case of a right-hand vehicle traffic lane, the direction indicator light of the left rear lamp includes a U-turn indicator light and a left turn indicator light, and the direction indicator light of the right rear lamp includes a right turn indicator light, in a case of a left-hand vehicle traffic lane, the direction indicator light of the right rear lamp includes a U-turn indicator light and a right turn indicator light, and the direction indicator light of the left rear lamp includes a left turn indicator light, when the direction indicator light of the rear lamp is the U-turn indicator light, the left, upper, and right LED arrays provided in the direction indicator light are turned on simultaneously or sequentially, and when the direction indicator light of the rear lamp is the left or right turn indicator light, a part of the left, upper, and right LED arrays provided in the direction indicator light is turned on.

According to the present invention, there is provided an autonomous driving method for an autonomous driving device, in which a rear lamp of a vehicle is configured such that all LED arrays provided in the direction indicator light are turned on in a case of a U-turn indicator light, and a part of the LED arrays provided in the direction indicator light are turned on in a case of a left turn indicator light, wherein the rear lamp is configured by an LED array arranged in a C-shape or an inverted-U-shape with a predetermined width, and the autonomous driving method includes: calculating an estimation turning time of waiting vehicles in a first lane and an estimation turning time of waiting vehicles in a second lane on a road where a left turn sign and a U-turn sign are drawn on the first lane, and the left turn sign is drawn on the second lane through a connectivity technology; and determining whether to change a lane of a following vehicle by using the calculated estimation turning times.

Advantageous Effects of the Invention

According to the present invention, the U-turn indicator rear lamp is used in combination with one of various indicator lights provided at the rear portion of the vehicle, so that the production cost can be reduced, and the influence on a design of the vehicle can be minimized.

In addition, since a U-turn direction indication function is applied to the rear lamp, and V2V and V2X communications are utilized, a vehicle attempting to turn left can easily select a lane, which supports a smooth traffic flow, so that the fuel efficiency can be improved.

DESCRIPTION OF REFERENCE NUMERALS

A100, A200, A300: Center area, peripheral area, outer area
L100, L200, L300: Upper, left, and right LED arrays
LVR: Operation lever

BEST MODE

Hereinafter, preferred embodiments of the present invention will be described in detail with reference to the accompanying drawings. For convenience of description, components shown in the drawings may be exaggerated, omitted, or schematically represented.

Figure 1:
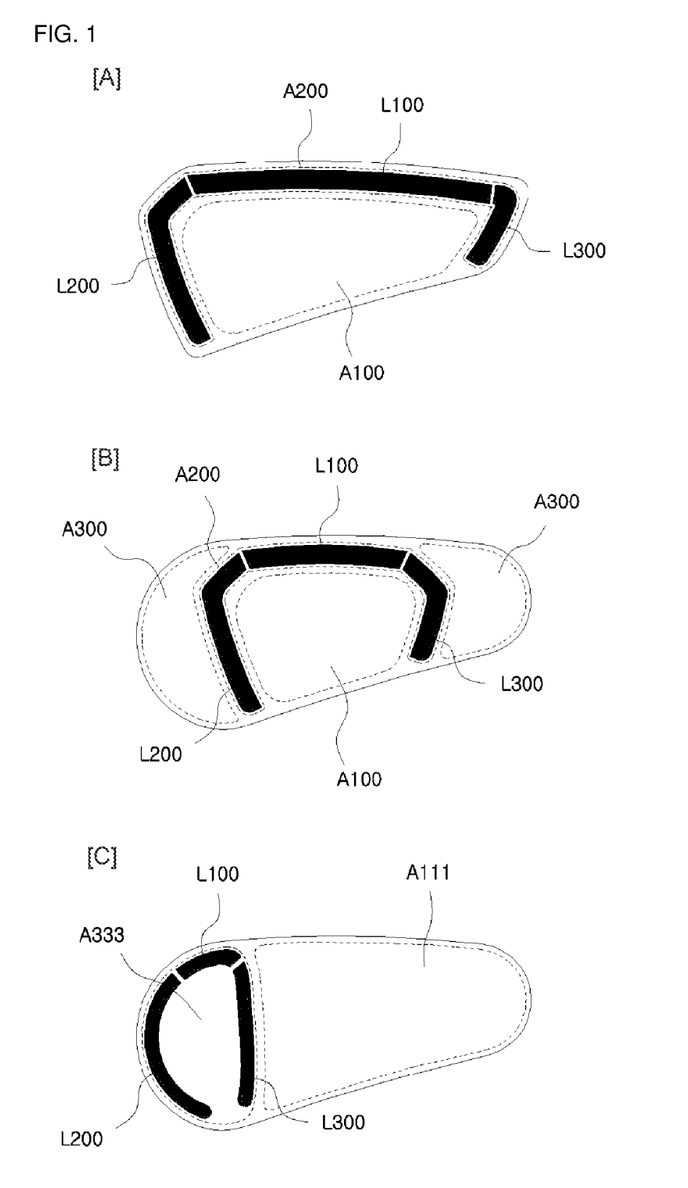
FIG. 1 shows a rear lamp according to an embodiment of the present invention.

FIG. 1 shows a rear lamp according to an embodiment of the present invention.

A rear lamp according to the present invention may include a lamp case and an indicator light source provided inside the lamp case. The indicator light source may include a reverse light, a direction indicator light, a brake light, and a taillight, which are disposed at different positions inside the lamp case. An incandescent light bulb or a light emitting diode may be used as a light source of the indicator light source. Hereinafter, an embodiment of the present invention in which a light emitting diode is used as the light source will be described.

In the present invention, a light emitting diode or a light emitting diode array that emits different color lights may be used as a light source. The light emitting diode array refers to a configuration in which a plurality of light emitting diodes are spaced apart from each other by a predetermined interval. As another embodiment, a white light emitting diode may be used as a light source, and a light transmission plate having a predetermined color may be additionally provided in the lamp case.

A shape of the rear lamp may vary by vehicle manufacturer. For convenience of description, a U-turn indicator light of the present invention will be described as being provided in a peripheral area, which will be described below, when applying the U-turn indicator light to the rear lamp of a vehicle. Accordingly, a first embodiment including a center area and a peripheral area, and a second embodiment including a center area, a peripheral area, and an outer area of the present invention will be described.

Referring to FIG. 1(A), a rear lamp according to the first embodiment of the present invention may include a center area A100 and a peripheral area A200. The peripheral area A200 may be disposed on an outer side of the center area to surround at least a part of the center area. The peripheral area A200 may be an area including upper, left, and right sides of the center area. The peripheral area may have a C-shape or an inverted-U-shape, which is partially cut and has a predetermined width. As an embodiment of the present invention, the peripheral area may be arranged such that an open portion of the C-shape faces downward to a ground.

The reverse light, the brake right, and the taillight may be provided in the center area A100, and the direction indicator light may be provided in the peripheral area A200.

Referring to FIG. 1(B), a rear lamp according to the second embodiment of the present invention may further include an outer area A300 formed on an outer side of the center area A100 and the peripheral area A200. The rear lamp according to the embodiment may include a center area, a peripheral area, and an outer area. The center area may be disposed on an inner side of the peripheral area, and the outer area may be disposed on an outer side of the peripheral area.

The direction indicator light may be disposed in the peripheral area A200, and the reverse light, the brake right, and the taillight may be distributed in the center area A100 and the outer area A300. For example, one or two indicator light sources of the reverse light, the brake right, and the taillight may be provided in the center area A100, and an indicator light source except for the indicator light sources provided in the center area and the peripheral area may be provided in the outer area A300.

The direction indicator lights according to the first and second embodiments of the present invention may include a turn indicator light and a U-turn indicator light, and the turn indicator light may be a left turn indicator light or a right turn indicator light. According to the present invention, the left turn indicator light and the U-turn indicator light may be provided in one rear lamp, and only the right turn indicator light may be provided in an opposite rear lamp. As an embodiment, the left turn indicator light and the U-turn indicator light may be provided in a left rear lamp, and only the right turn indicator light may be provided in a right rear lamp.

The direction indicator light according to the present invention may be implemented as a light emitting diode (LED) array arranged in a C-shape or an inverted-U-shape, which has one open side, with a predetermined width, and light emission of the U-turn indicator light may include light emission of the left turn indicator light. In detail, all provided LED arrays may be turned on in a case of the U-turn indicator light, and a part of the provided LED arrays may be turned on in a case of the left turn indicator light.

Hereinafter, the left rear lamp in which the U-turn indicator light is provided according to the present invention will be mainly described.

The direction indicator light provided in the peripheral area may include upper, left, and right LED arrays. The LED arrays may be provided in an upper area, a left area, and a right area of the peripheral area, respectively. An upper LED array L100 may be provided in the upper area of the peripheral area, a left LED array L200 may be provided in the left area of the peripheral area, and a right LED array L300 may be provided in the right area of the peripheral area. The left, upper, and right LED arrays may be consecutively arranged to form a shape representing a U-turn. Depending on a size of the rear lamp, and a length, a width, and the like of the LED array, each of the left, upper, and right LED arrays may include a round portion and a bent portion.

The direction indicator light according to the present invention may include a turn indicator light and a U-turn indicator light. The left, upper, and right LED arrays L100, L200, and L300 provided in the peripheral area A200 may perform functions of the turn indicator light and the U-turn indicator light. In a case of a U-turn lighting signal, all the left, upper, and right LED arrays may emit light. Alternatively, in a case of a left turn lighting signal, one or two LED arrays among the left, upper, and right LED arrays may be emit light in combination with each other.

FIG. 1(C) illustrates a configuration in which the direction indicator light is provided at an outermost side. In this case, the outermost side refers to the left area in a case of the left rear lamp or the right area in a case of the right rear lamp.

The rear lamp according to the embodiment may include an outermost area A333 and a remaining area A111, in which, based on a rear center of the vehicle, remaining areas on left and right sides may be close to each other, and outermost areas on the left and right sides may be farther away from each other than the remaining areas.

In the drawing, at least one or two indicator light sources among the reverse light, the brake right, and the taillight may be provided in the remaining area of the rear lamp except for the outermost side. Accordingly, the direction indicator light is provided on the outermost side, so that a driver of a following vehicle or a driver of a vehicle driven in an adjacent lane may easily and visually recognize the direction indicator light.

In this case, the LED array that emits the light may be flashing to implement the U-turn indicator light or the left turn indicator light. Preferably, in order to visually represent the U-turn, light may be sequentially emitted from a light emitting diode at one end of an LED array, which is a combination of the left, upper, and right LED arrays, to a light emitting diode at an opposite end of the LED array, or may be simultaneously emitted from the LED array that is a combination of the left, upper, and right LED arrays.

According to the present invention, in order to represent the U-turn more visually, the left LED array and the right LED array may have mutually different shapes. For example, the LED array may be formed by arranging LEDs in an arrowhead shape or an arrow shape at an end of the left or right LED array, which is an end of the LED array where the upper LED array is not connected.

Meanwhile, in a case of a country where a right-hand vehicle traffic lane is provided, such as in Korea, the direction indicator light of the left rear lamp may include a U-turn indicator light and a left turn indicator light, and the direction indicator light of the right rear lamp may include a right turn indicator light. However, in a case of a country where a left-hand vehicle traffic lane is provided, such as Japan, the direction indicator light of the right rear lamp may include a U-turn indicator light and a right turn indicator light, and the direction indicator light of the left rear lamp may include a left turn indicator light.

Such U-turn indicator lights may be provided in consideration of traffic laws, road conditions, and the like of each country.

Figure 2:
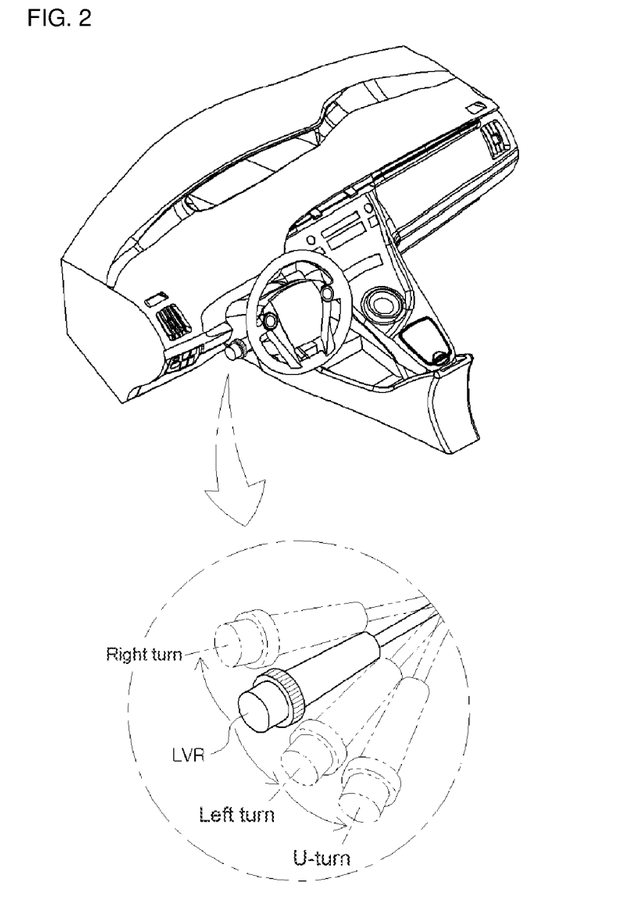
FIG. 2 shows an operation lever for driving the rear lamp according to the present invention.

FIG. 2 shows an operation lever for driving the rear lamp according to the present invention.

The U-turn lighting signal according to the present invention may be generated by an operation of an operation lever LVR provided on a left side of a steering wheel. When the operation lever is clicked upward once, a lighting signal for emitting light from the right turn indicator light may be generated. In addition, when the operation lever is clicked downward once, a lighting signal for emitting light from the left turn indicator light may be generated. Further, when the operation lever is clicked downward once more while the left turn indicator light is turned on, a lighting signal for emitting light from the U-turn indicator light may be generated.

Each of the lighting signals generated as described above may be transmitted to a controller such as an electronic control unit (ECU) through controller area network (CAN) communication, and the controller may output a switching signal to apply a light emitting power to the LED array.

The rear lamp having the U-turn indicator light according to the present invention may be applied to a semi-autonomous or fully-autonomous automatic driving device for the vehicle.

Figure 3:
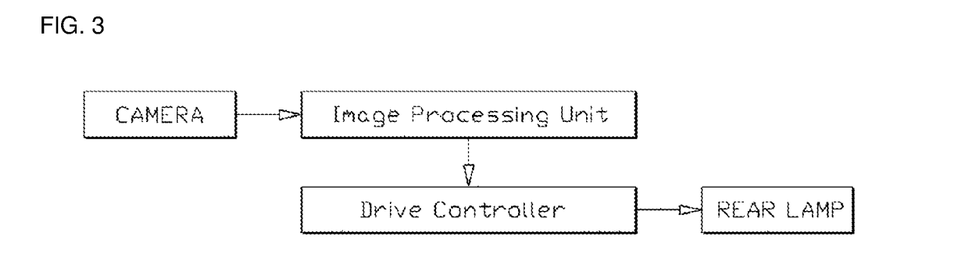
FIG. 3 shows an automatic driving device according to the present invention.

FIG. 3 shows an automatic driving device according to the present invention.

An automatic driving device according to the present invention may include a rear lamp, a camera, an image processing unit, and a driver controller.

When the rear lamp according to the present invention is provided in a vehicle on which the automatic driving device is mounted, a camera for capturing an image of a forward side of the vehicle and an image analysis unit may be additionally provided.

The camera may capture an image of a rear lamp of a front vehicle. The captured image may be output to the image analysis unit, and the image analysis unit may detect, based on the image of the rear lamp, whether the front vehicle indicates a U-turn, a left turn, a right turn, a deceleration, or a reverse.

The image analysis unit may set the left and right rear lamps of the vehicle as a region of interest (ROI), and may recognize a predetermined vehicle motion signal based on a color and a shape of the lamp in the ROI. In this case, the predetermined vehicle motion signal may be a signal indicated by the rear lamp, such as a left turn, a right turn, a U-turn, a stop, and a reverse.

The motion signal recognized by the image analysis unit may be transmitted to the driver controller of the automatic driving device. A rear vehicle may adjust a speed of the vehicle or change a lane based on a motion of the vehicle recognized from the rear lamp of the front vehicle.

Figure 4:
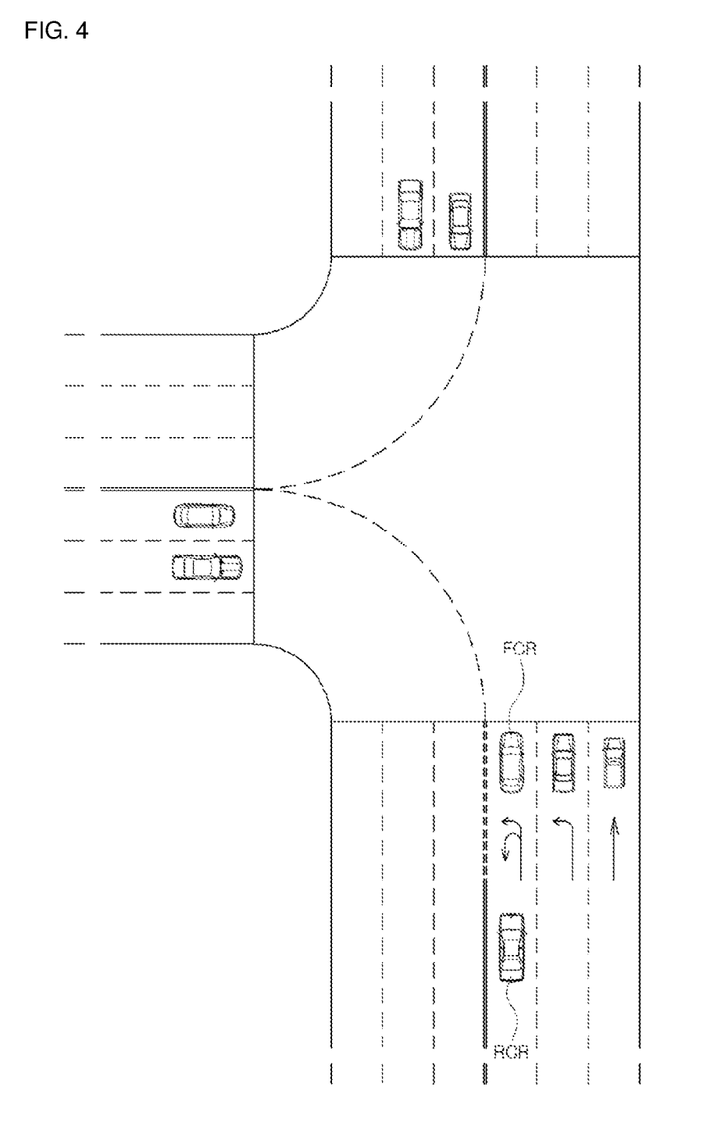
FIG. 4 shows a state in which a vehicle is driven on a road according to the present invention.
Figure 5:
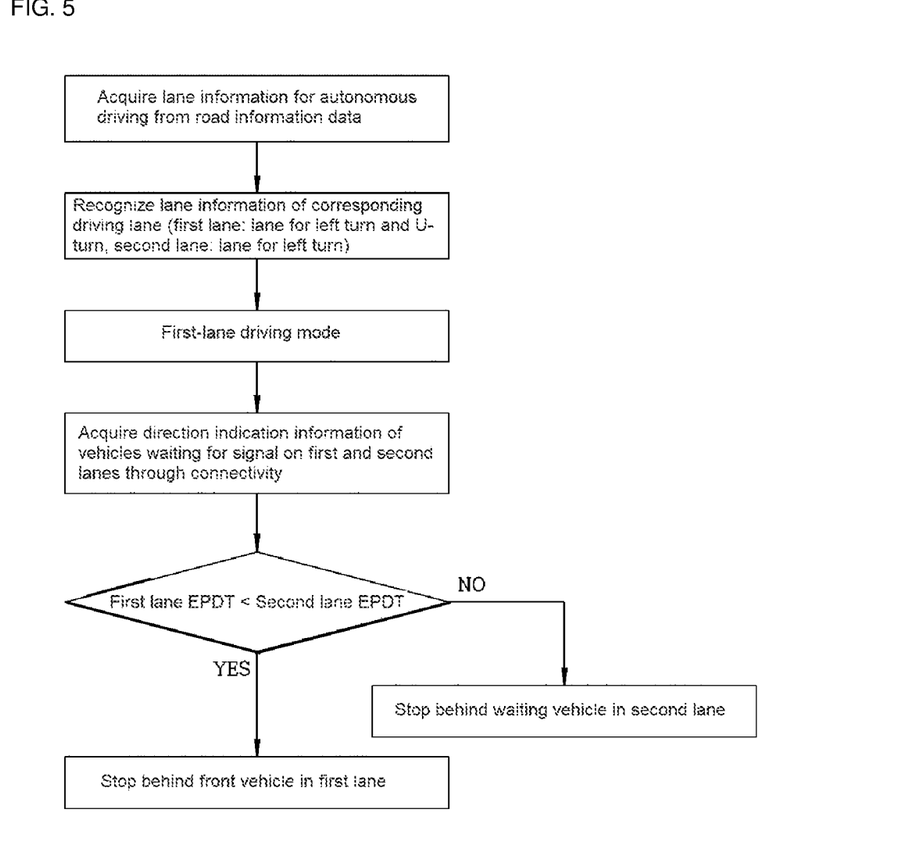
FIG. 5 shows an autonomous driving method for the vehicle provided with an autonomous driving device according to the present invention.

FIG. 4 shows a state in which a vehicle is driven on a road according to the present invention, and FIG. 5 shows an autonomous driving method for the vehicle provided with an autonomous driving device according to the present invention.

Referring to FIG. 4, a left turn sign and a U-turn sign are drawn on a first lane of a road, and the left turn sign is drawn on a second lane of the road.

Both a front vehicle FCR and a rear vehicle RCR are driven on the first lane. A driver of the rear vehicle (following vehicle) may see a lighting state of the rear lamp of the front vehicle to recognize whether the front vehicle attempts to make a left turn or a U-turn.

When the rear lamp of the front vehicle indicates a left turn signal, the vehicle may stop behind the front vehicle, and when the rear lamp of the front vehicle indicates a U-turn signal, the vehicle may change the lane from the first lane to the second lane.

As another embodiment, when the rear vehicle is an autonomous vehicle, a camera of the rear vehicle (following vehicle) may capture an image of the rear lamp of the front vehicle. The camera of the rear vehicle may detect whether the front vehicle attempts to make a left turn or a U-turn by capturing the lighting state of the rear lamp of the front vehicle.

When the rear lamp of the front vehicle indicates a left turn light emission signal, the rear vehicle may detect a stop position (or an estimated stop position) of the front vehicle and a stop position (or an estimated stop position) of a last vehicle among vehicles waiting on the second lane, and the driving of the vehicle may be set to select a lane with a small number of waiting vehicles.

In detail, in a state where both the front vehicle and the rear vehicle are driven on the first lane, when the light emission signal recognized from the rear lamp of the front vehicle is the U-turn signal in the image captured by the camera of the rear vehicle, the rear vehicle may detect a stop position (or an estimated stop position) of the front vehicle and a stop position (or an estimated stop position) of a last vehicle among vehicles waiting on the second lane, may be set to continue the driving on the first lane when there are a small number of vehicles waiting on the first lane, and may be set to change the lane to the second lane when the number of vehicles waiting on the first lane is greater than or equal to the number of vehicles waiting on the second lane.

In general, vehicles on the road may take a longer time to make a U-turn than a left turn. For this reason, in the present invention, in a state where the front vehicle driven on the first lane indicates the U-turn signal, when the number of vehicles waiting on the first lane is equal to the number of vehicles waiting on the second lane, the vehicle may be set to change the lane to the second lane, so that congestion of the road can be resolved.

Such a technology may be applied to autonomous driving devices using V2V and V2X communication.

First, direction indication information such as a left turn, a right turn, and a U-turn may be acquired through V2V and V2X from vehicles waiting on the first and second lanes.

Next, the autonomous driving device of the following vehicle may calculate an estimation turning time EPDT of waiting vehicles in the first lane and an estimation turning time EPDT of waiting vehicles in the second lane, and may determine whether to change a lane of the following vehicle from the calculated estimation turning times EPDT of the waiting vehicles. In this case, a U-turn time of each of the waiting vehicles may be set longer than a left turn time of each of the waiting vehicles.

For example, assuming that there are three vehicles waiting on the first lane that allows to make a U-turn and a left turn and five waiting vehicles on the second lane that allows only a left turn, an average time required to make a U-turn for one waiting vehicle which is waiting on the first lane is 10 seconds, and an average time required to make a left turn for one waiting vehicle which is waiting on the first lane is 5 seconds, the following vehicle RCR attempting to turn left may naturally enter the first lane with a small number of waiting vehicles in the absence of the U-turn signal.

However, when the following vehicle RCR receives an intention for a U-turn through V2V and V2X from the vehicles waiting on the first lane, the following vehicle RCR may calculate a total waiting time obtained in consideration of an estimated driving route of the vehicles waiting on the first and second lanes and front vehicles as well as the total number of waiting vehicles, and may determine whether to drive in the first lane or the second lane in consideration of a signal change time while simultaneously communicating with a traffic system such as a traffic light.

In the above example, it takes about 30 seconds for all the vehicles waiting on the first lane to make U-turns and pass through because 10 seconds are required for each of three vehicles, and it takes about 25 seconds for all the vehicles waiting on the second lane to make left turns and pass through because 5 seconds are required for each of five vehicles, so that the following vehicle RCR attempting to turn left may enter the second lane with a larger number of waiting vehicles than the first lane and pass through an intersection. Accordingly, a traffic situation can be improved, and fuel efficiency can be improved.

The U-turn sign applied to the U-turn indicator rear lamp according to the present invention may be provided on a side-view mirror. In this case, light may also be turned on in the side-view mirror in the same way as the rear lamp is turned on. Accordingly, a driver in a side lane can easily recognize whether a vehicle is a left-turn vehicle or a U-turn vehicle and change the lane, and defensive driving or safe driving can be induced.

As described above, specific embodiments of the present invention have been described in detail, but the present invention is not limited to the above embodiments. In addition, various modifications can be made by those skilled in the art without departing from the scope of the technical idea of the present invention.

The invention claimed is:

1. An autonomous driving method using connectivity for an autonomous driving device provided with a rear lamp in which all LED arrays provided in the direction indicator light are turned on in a case of a U-turn indicator light, and a part of the LED arrays provided in the direction indicator light are turned on in a case of a left turn indicator light, wherein the rear lamp is configured by an LED array arranged in a C-shape or an inverted-U-shape with a predetermined width, and the autonomous driving method comprises:
calculating an estimation turning time of waiting vehicles in a first lane and an estimation turning time of waiting vehicles in a second lane on a road where a left turn sign and a U-turn sign are drawn on the first lane, and the left turn sign is drawn on the second lane;
determining whether to change a lane of a following vehicle from the calculated estimation turning times; and
setting a U-turn time of each of the waiting vehicles to be longer than a left turn time of each of the waiting vehicles.

* * * * *